(12) United States Patent
Jacobsen et al.

(10) Patent No.: US 8,594,494 B2
(45) Date of Patent: *Nov. 26, 2013

(54) SINGLE ACTUATOR CONFIGURATION FOR A CAMERA MODULE

(71) Applicant: Digital Imaging Systems GmbH, Kirchheim/Teck-Nabern (DE)

(72) Inventors: Dirk Jacobsen, Dettingen unterTeck (DE); Horst Knoedgen, Munich (DE)

(73) Assignee: RPX Corporation, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/684,776

(22) Filed: Nov. 26, 2012

(65) Prior Publication Data

US 2013/0083235 A1 Apr. 4, 2013

Related U.S. Application Data

(63) Continuation of application No. 12/806,322, filed on Aug. 10, 2010, now Pat. No. 8,320,756.

(51) Int. Cl.
*G03B 13/34* (2006.01)
*G03B 17/00* (2006.01)
*H04N 5/232* (2006.01)
*G02B 7/02* (2006.01)

(52) U.S. Cl.
USPC .......... 396/133; 396/529; 348/340; 348/357; 359/824

(58) Field of Classification Search
USPC ............ 396/133, 529; 348/357; 359/823, 824
See application file for complete search history.

(56) References Cited

U.S. PATENT DOCUMENTS

| 4,783,676 | A | 11/1988 | Aihara et al. |
| 4,873,542 | A | 10/1989 | Nakayama |
| 7,400,068 | B2 | 7/2008 | Tseng |
| 8,086,099 | B2 | 12/2011 | Schworm et al. |
| 8,320,756 | B2 * | 11/2012 | Jacobsen et al. .............. 396/133 |
| 2010/0053784 | A1 | 3/2010 | Kang et al. |
| 2011/0141587 | A1 | 6/2011 | Schworm et al. |
| 2011/0273789 | A1 | 11/2011 | Knoedgen |

* cited by examiner

*Primary Examiner* — Rochelle-Ann J Blackman
(74) *Attorney, Agent, or Firm* — Howison & Arnott, L.L.P.

(57) ABSTRACT

Systems and methods for camera modules having a movable lens barrel, allowing a maximum lens diameter with minimal outside dimensions are disclosed. At least one single linear actuator is moving the lens barrel. Each actuator is deployed in an own corner of the camera module. The moving lens barrel is guided by rolling elements bearings. The actuator comprises a stator, comprising one or more coils wrapped around a rod of magnetic metal and an anchor comprising one or more permanent magnets, which are tightly attached to the lens barrel. An offset between the longitudinal center line of magnets of the anchor and the center of the stator generates a permanent force pushing the lens barrel in direction of the stator of the motor and consequently pushes protrusions on the lens barrel onto the rolling elements bearings, thus preventing the bearings to fall apart in case of a mechanical shock.

8 Claims, 4 Drawing Sheets

SINGLE ACTUATOR CONFIGURATION FOR A CAMERA MODULE

This is a continuation of U.S. patent application Ser. No. 12/806,322, filed on Aug. 10, 2010, which is herein incorporated by reference in its entirety, and assigned to a common assignee.

RELATED APPLICATIONS

This application is related to the following U.S. patent applications:
DI09-003/004, titled "Camera module having a low-friction movable lens", Ser. No. 12/661,752, filing date Mar. 23, 2010,
DI09-007, titled "Twin-actuator configuration for a camera module", Ser. No. 12/661,755, filing date Mar. 23, 2010, and
DI09-017, titled "Linear motor with integrated position sensor", Ser. No. 12/799,947, filing date May 5, 2010,
which are assigned to the same assignee. The contents of these applications are hereby incorporated by reference in their entirety.

BACKGROUND OF THE INVENTION

1. Field of the Invention

This invention relates generally to camera modules and relates more specifically to camera modules having a movable lens barrel and wherein the actuators are deployed in a way to achieve minimal size of the camera module.

2. Description of the Prior Art

Digital camera modules are used with many electronic devices such as e.g. mobile phones, personal data assistants (PDAs), computers, etc. These camera modules have to be as small as possible, reliable, and easy to be used, robust and require minimal power consumption. Furthermore the design of the camera modules should allow low manufacturing cost, while the quality of the images has to conform to a high standard.

Therefore modern camera modules should allow auto-focusing and minimal friction of the bearing for a movable lens barrel in order to achieve precise focusing of the camera.

It is important that the camera modules, which are to be built in mobile electronic devices as e.g. mobile phones, require minimal size. It is a challenge for the designers of camera modules to develop auto-focus camera modules having a reliable drive for moving a lens barrel having minimal size and consuming minimal power.

Solutions dealing with the design of cameras and related auto-focus drives are described in following patents:

U.S. Patent (U.S. Pat. No. 7,400,068 to Tseng) teaches a voice coil motor apparatus applied to an auto-focus or variable-focus lens module of a miniaturized camera including: a voice coil motor, a plurality of steel guidance shafts, a lens holder, and a base. The voice coil motor also includes a magnetic part including magnets and yokes, and an electrical part including a coil winding. The magnetic part is rigidly coupled to the lens holder to form the moving member. The electrical part and the steel guidance shafts are fixed on the base to form the non-moving member. The pre-loaded force due to the interaction between the leakage flux of the magnetic part and the steel guidance shafts eliminates the free-play resulting from the tolerance gap between the moving and the non-moving members, and that the magnets and the yokes form a non-circular magnetic structure having a rectangular contour in order to minimize the overall dimension.

U.S. Patent (U.S. Pat. No. 4,873,542 to Nakayama) discloses an auto-focus camera having a focusing lens supporting feed screw rod supported substantially parallel to the lens optical axis and having a slit for focusing at its one end, and a spacer nut meshed with a feed screw portion of the feed screw rod, so that is longitudinal movement is prevented, and rotated by the focus control motor.

U.S. Patent (U.S. Pat. No. 4,783,676 to Aihara et al.) discloses a lens drive device for a camera driving a lens by a motor to a position preset by an operator. The lens position is stored in a memory. When the lens is to be moved to the stored position while the lens is moved by an auto-focus device to an in-focus position, the lens is instantly moved by the motor to the stored position based on the data stored in the memory.

SUMMARY OF THE INVENTION

A principal object of the present invention is to achieve methods and systems to achieve camera modules having a movable lens barrel, allowing a maximum lens diameter with minimal outside dimensions A further object of the present invention is to use only one actuator to move the lens barrel.

A further object of the present invention is to deploy the actuator in a separate corner of the camera module.

A further object of the present invention is to use rolling bearings to guide the movements of the lens barrel.

A further object of the present invention is to secure a safe operation of the rolling-elements bearings in case of a mechanic shock.

In accordance with the objects of this invention a method for camera modules having a movable lens barrel allowing a maximum lens diameter with minimal outside dimensions has been achieved. The method invented comprises the following steps of: (1) providing a camera module comprising a movable lens barrel driven by at least one single linear actuator, (2) deploying the actuator in a corner of the camera module, (3) guiding the movements of the lens barrel driven by said at least one actuator to a desired position by rolling elements bearings, and (4) applying a pre-load force to the rolling elements bearings, wherein this force is present in any position of the lens barrel.

In accordance with the objects of this invention a camera module having a movable lens barrel, allowing a maximum lens diameter with minimal outside dimensions has been achieved. The camera module invented comprises: an image sensor, a shutter with an aperture function driven by a linear motor, said motor driving the shutter, wherein the motor has an integrated position sensing system, and a movable lens barrel. Furthermore the camera module invented comprises at least one linear actuator to move said lens barrel, wherein each actuator is deployed in an own corner of the camera module, wherein the actuators are generating a pre-load force on rolling elements bearings, an integrated circuit controlling the motor driving the shutter and the actuators moving the lens barrel, and said rolling elements bearings wherein the rolling elements of each bearing are moving between the lens barrel and a fixed part of the camera.

In accordance with the objects of this invention a camera module having a movable lens barrel, allowing a maximum lens diameter with minimal outside dimensions has been achieved. The camera module invented comprises: a movable lens barrel, at least one single linear actuator to move said lens barrel, wherein each actuator comprises a stator, fastened on a frame of the camera module, and an anchor, fastened on the lens barrel, and wherein each actuator is deployed in an own corner of the camera module, and a means to guide the movements of the lens barrel.

BRIEF DESCRIPTION OF THE DRAWINGS

In the accompanying drawings forming a material part of this description, there is shown.

DESCRIPTION OF THE PREFERRED EMBODIMENTS

The preferred embodiments disclose methods and systems to design camera modules having a movable lens barrel driven, by a single linear actuator and allowing a maximum lens diameter with minimal outside dimensions.

Preferred embodiments of the invention are characterized by using only one linear actuator to move a lens barrel. This single actuator is located in one corner of a camera module. It should be understood that alternatively more than one actuator could be used to drive the lens barrel. Using actuators with more than one anchor would be possible as well.

In preferred embodiments of the invention an actuator with integrated position detection is used to drive the movable lens barrel and to control an actual position of the lens barrel, e.g. as disclosed in the patent application DI09-017, titled "Linear motor with integrated position sensor", Ser. No. 12/799,947, filing date May 5, 2010. Other position sensing methods as e.g. capacitive sensors or Hall sensors could be used as well.

All embodiments of the present invention achieve minimal outer dimensions by using one actuator only to move the lens barrel and have this actuator deployed in a corner of the camera module. The actuators can be built smaller if more than one actuator is used.

Figure 1:
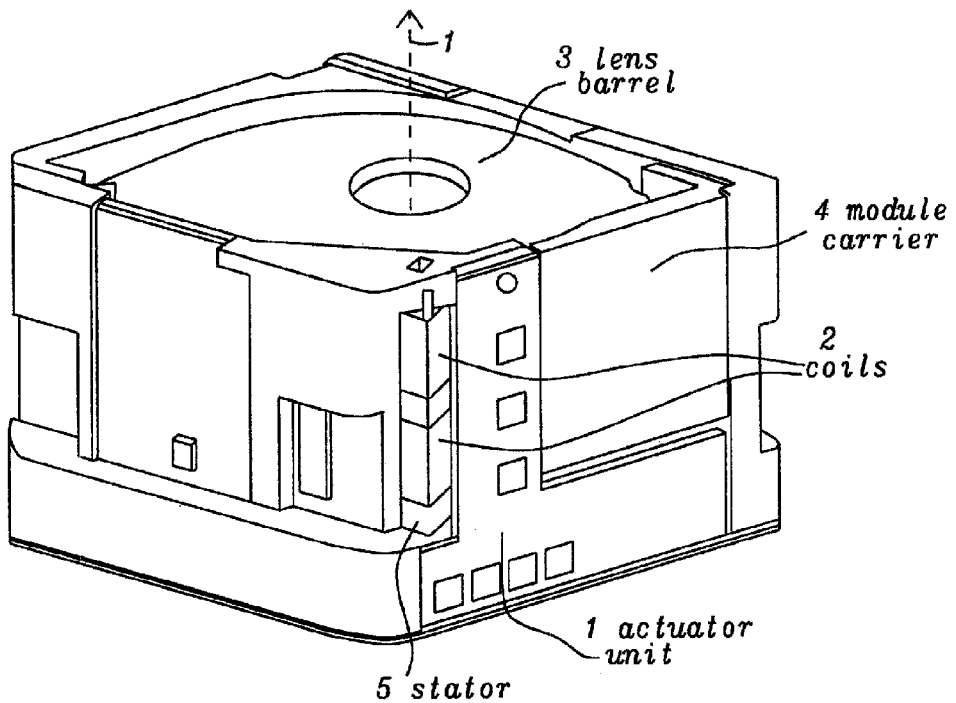
FIG. 1 shows an oblique view a camera module of the present invention.

In a first preferred embodiment, the invention has been used with a camera module using ball bearings as shown in FIG. 1.

FIG. 1 shows an oblique view of an embodiment of the camera module invented. It shows a single actuator unit 1 comprising a flexible printed circuit (FPC), a stator 5, having two coils 2 wrapped around magnetic metal as e.g. iron, and an anchor, comprising two magnets fastened on it. Alternatively only one coil or more than two coils could be used with the stator and also only one magnet or more than two magnets could be deployed on the anchor. The anchor is firmly attached to the lens barrel. The actuator is driving the lens barrel 3 to a position desired along the optical axis of the camera dependent upon currents in the two coils. The actuator may have an integrated position sensing capability or other methods to sense the position of the moving lens barrel can be applied, i.e. using for example capacitive sensors, Hall sensor or magnetic sensors.

Furthermore the camera comprises a module carrier 4, comprising an integrated circuit (IC) to control the operation of the camera and an image sensor.

Figure 2:
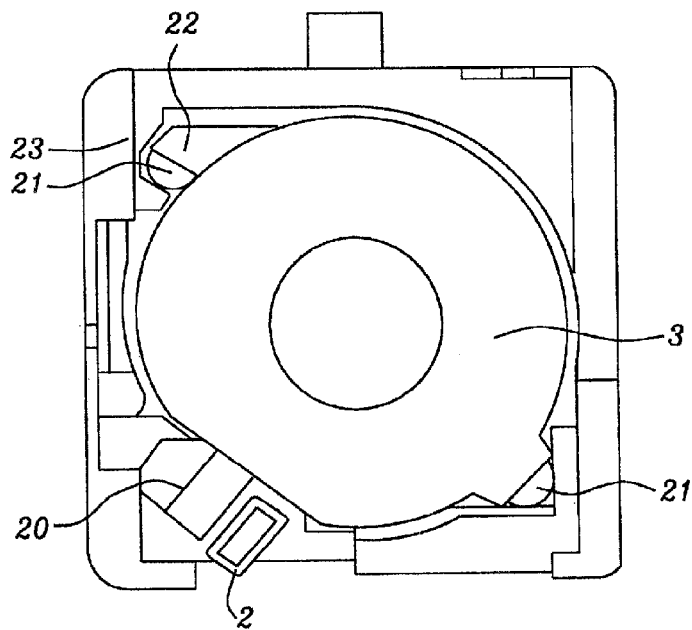
FIG. 2 shows a top view on the camera module invented illustrating the lens and actuator integration.

In a preferred embodiment of the invention a bidirectional actuator, comprising the stator having coils wrapped around magnetic metal, preferably iron, and the moving anchor having at least at least one permanent magnet, is deployed to move the lens barrel shown in of FIGS. 1-2. The actuator is used to move the lens barrel and the permanent magnet is mounted on the lens barrel and the iron carrying the coils is mounted on the carrier.

Furthermore FIG. 1 shows a movable lens barrel 3, which is moved by the actuator unit 1 and guided by e.g. rolling elements bearings (not shown in FIG. 1) to achieve minimal friction of the movement of the lens barrel. The actuator fits into one of the corners of the camera module with minimum extra space requirement because the lens and lens barrel are round and the camera module is rectangular.

FIG. 2 shows a top view on the camera module invented illustrating the lens and actuator integration. It shows the coil assembly 2 of the stator, the magnet assembly 20 of the moving anchor, which is firmly attached to the lens barrel 3, and the ball bearings 21. Alternatively any rolling elements bearings, as e.g. roller bearings could be used as well instead of ball bearings. Furthermore a nose 22 is deployed on the lens barrel for one or more rolling elements bearing, wherein the balls are moving between a corresponding nose 22 and a fixed frame 23. Placing the actuator and rolling elements bearings 21 in corners of the camera module as shown in FIG. 2 allows a maximum diameter of the lens barrel 3 in a given package size.

Figure 3A:
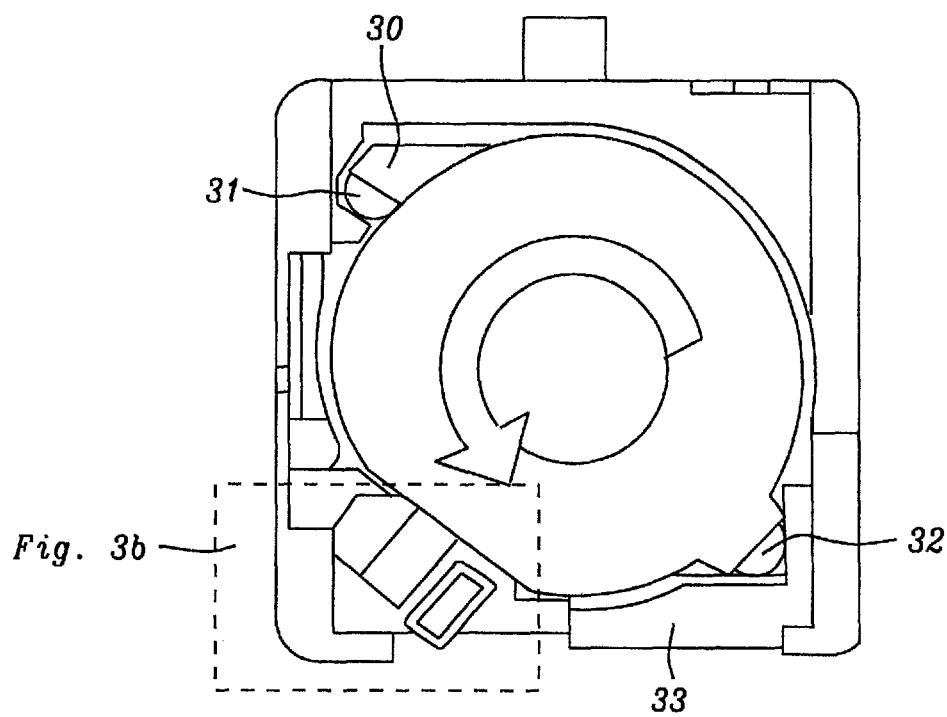
FIG. 3a illustrates the magnetic retention system of the present invention.

FIG. 3a illustrates the magnetic retention system of the present invention. In order to minimize the the force required for lens displacement, mechanical sources of friction need to be eliminated as far as possible. The magnetic retention system has no friction sources except the rolling elements bearings.

Figure 3B:
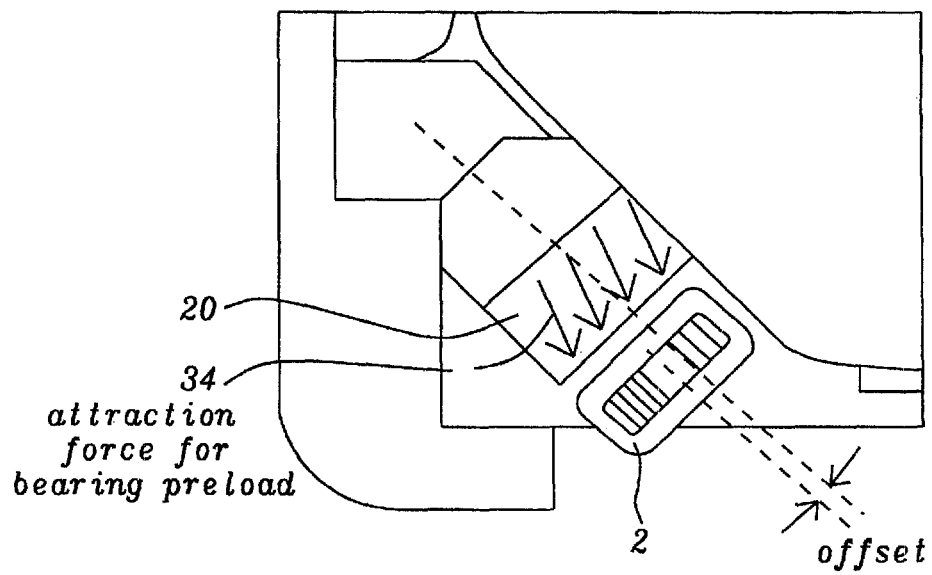
FIG. 3b shows in detail a top view of the actuator of the present invention including the coil assembly of the stator and the magnet assembly of the moving anchor.

As shown in detail in FIG. 3b there is an offset between the longitudinal center line of the magnets of the anchor and the longitudinal center line of the stator, i.e. the midline of the coils. This offset generates a permanent force in the direction of the arrow of FIG. 3a, i.e. independently of the actual position of the lens barrel, which is moving along the optical axis, this force pushes the lens barrel in the direction of the stator of the motor and consequently pushes the nose 30 of the lens barrel onto the correspondent rolling elements bearing, thus preventing the rolling element bearing to fall apart in case of a mechanical shock. In a preferred embodiment of the invention ball bearings 31 and 32 are used for rolling elements bearings and furthermore the part of the nose 30 pushing on the rolling element, e.g. ball 31, has about a same orientation as a midline of the linear actuator. In the preferred embodiment of FIG. 3a a nose in form of a a protrusion 32 is deployed in order to provide a area to put pressure on the ball 32, wherein this pressure is provided by the bearings pre-load of the actuator. Each rolling element of the bearings is moving between a correspondent nose or protrusion 30/32 of the moving lens barrel, the fixed frame 21 of the camera module, and also potentially a part of the lens barrel being close to the corresponding nose/protrusion.

It should be noted that FIG. 3a illustrates anon-limiting example of the camera module invented. Other kinds of rolling elements bearings, other numbers of rolling elements bearings, and other geometries of the noses/protrusions could alternatively be used with the present invention.

FIG. 3b shows the area surrounded by dotted lines of FIG. 3a enlarged. It shows in detail a top view of the actuator of the present invention including the coil assembly 2 of the stator 5 and the magnet assembly 20 of the moving anchor. The one or more permanent magnets of the magnet assembly 20 generate an attraction force to the metal coil core of the stator 2.

The arrows 34 illustrate the direction of magnetic force used for the pre-load of the bearings indendent of the actual position of the lens barrel, which can be moved to a position desired along the optical axis of the camera module.

Figure 4:
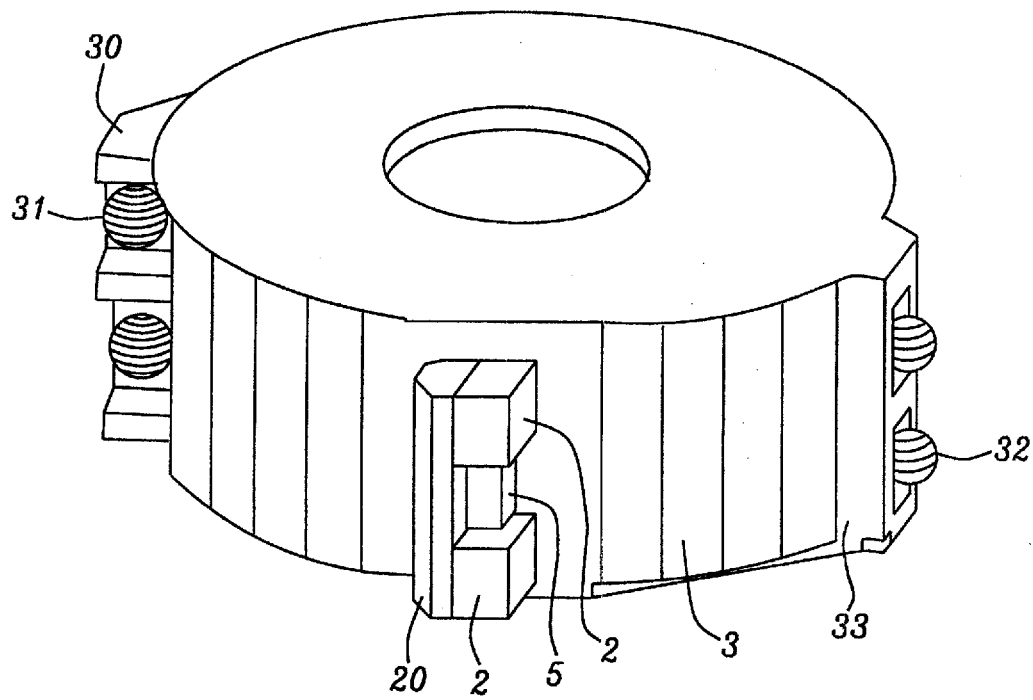
FIG. 4 illustrates an arrangement of a lens barrel, ball bearings and an actuator.

FIG. 4 illustrates a preferred embodiment of an arrangement of a lens barrel, ball bearings and an actuator comprising a stator 5 and an anchor 20 according to the invention. The same numerals for like components are used with FIG. 4 as with FIGS. 1-3a+b. FIG. 4 depicts a lens barrel 3, wherein the anchor 20 with one or more permanent magnets is fixedly fastened on the lens barrel 20. The stator comprises two coils 2 wrapped around a piece of magnetic metal. On the left side of the lens barrel are two balls 31 and an arrangement of correspondent noses 30. On the opposite side of the lens barrels are two balls 32 and a correspondent protrusion 33.

Figure 5:
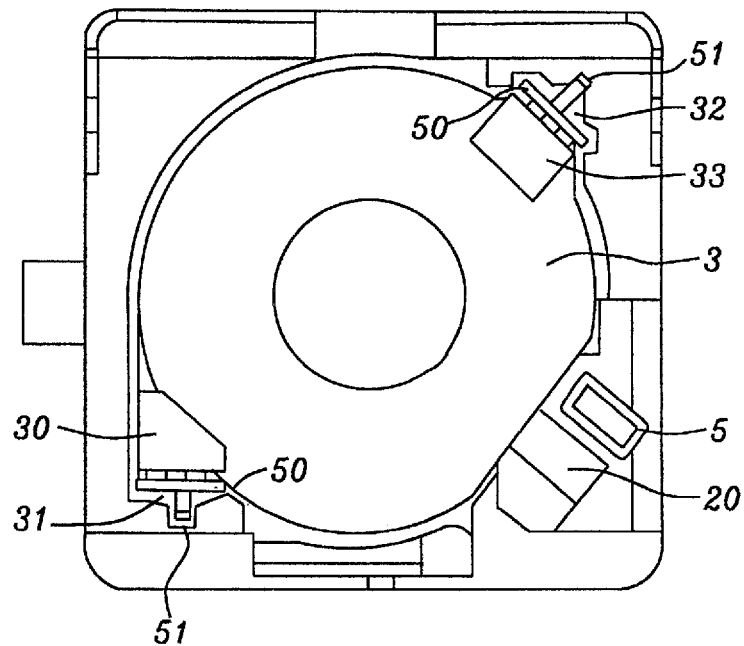
FIG. 5 illustrates a top view of the camera module invented inclusive ball cages of ball bearings.

FIG. 5 illustrates a top view of the camera module invented inclusive ball cages of ball bearings. FIG. 5 shows again the lens barrel 3, a stator 5 of the actuator and a correspondent anchor 20, a ball 31 with a correspondent nose 30, and on the opposite side a ball 32 with a correspondent protrusion 33. Furthermore it shows ball cages 50 around both balls 31 and 32 and a bearing pin 51 for each ball bearing. This bearing pin 51 is used to avoid creeping of the lens barrel by keeping balls and cages in place in case of any mechanical shock. Such a bearing pin has been disclosed in the patent application DI09-003/004, titled "camera module having a low-friction movable lens", Ser. No. 12/661,752, filing date Mar. 23, 2010.

Figure 6:
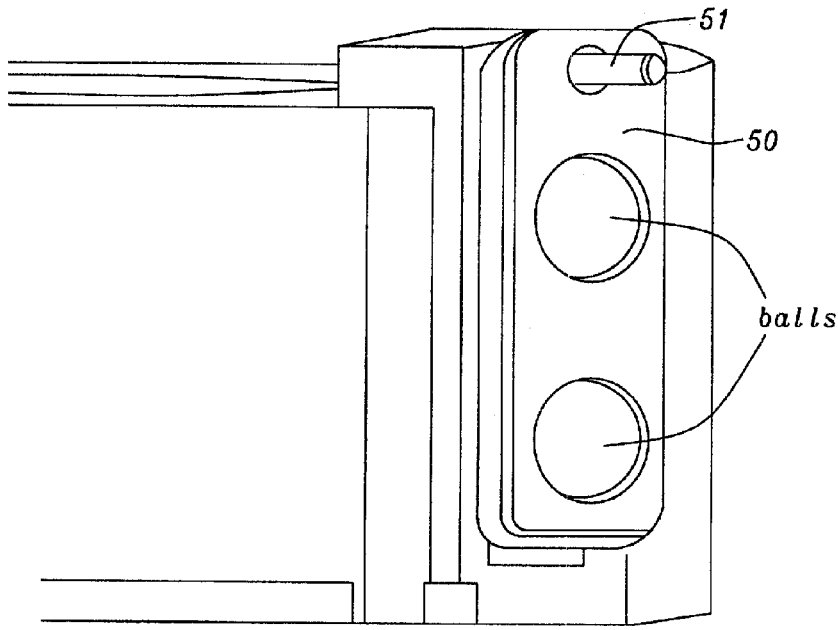
FIG. 6 shows a side view of an arrangement of balls, a ball cage, and a correspondent bearing pin.

FIG. 6 shows a side view of an arrangement of balls, a ball cage 50, and a correspondent bearing pin 51. The ball cage 51 is used to keep a constant distance between the balls of the ball bearings. In case that other types of rolling elements bearings are used correspondent rolling elements cages can be used as well but might not be absolutely required.

Figure 7:
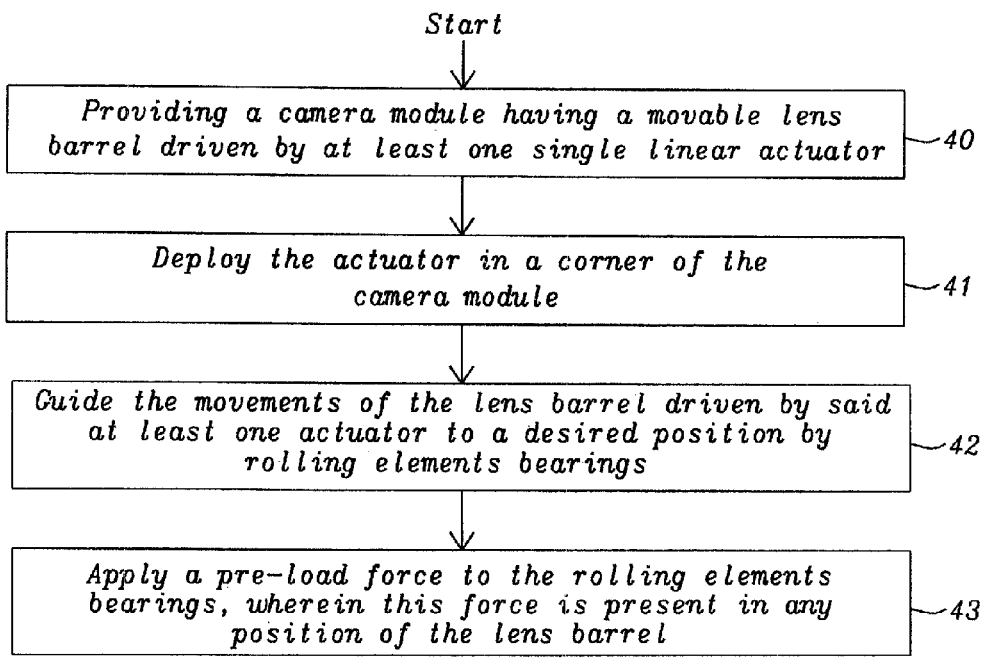
FIG. 7 illustrates a flowchart of a method invented for camera modules comprising a movable lens barrel, allowing a maximum lens diameter with minimal outside dimensions.

FIG. 7 illustrates a flowchart of a method invented for camera modules comprising a movable lens barrel, allowing a maximum lens diameter with minimal outside dimensions. A first step 70 describes the provision of a camera module comprising a movable lens barrel driven by at least one single linear actuator. The next step 71 illustrates deploying the actuator in a corner of the camera module. Step 72 describes guiding the movements of the lens barrel driven by said at least one actuator to a desired position by rolling elements bearings. These rolling elements bearings could be any kind of rolling elements bearings such as e.g. ball bearings, roller bearings, etc. In a preferred embodiment of the invention two rolling elements bearings have been deployed. Other number of such bearings could be deployed as well. Step 73 describes applying a pre-load force to the rolling elements bearings, wherein this force is present in any position of the lens barrel.

While the invention has been particularly shown and described with reference to the preferred embodiments thereof, it will be understood by those skilled in the art that various changes in form and details may be made without departing from the spirit and scope of the invention.

What is claimed is:

1. A camera comprising: an image sensor; a movable lens barrel; at least one linear actuator to move said lens barrel, wherein said at least one linear actuator is deployed in a corner of the camera, wherein the at least one linear actuator generates a pre-load force on rolling element bearings; wherein at least two rolling element bearings are provided at a circumferential surface of the barrel wherein one of said at least two rolling element bearings is tangentially oriented and an other of said at least two rolling element bearings is radially oriented, and wherein the pre-load force of the at least one linear actuator comprises a tangential component so that the tangentially oriented rolling element bearing is pressed against a corresponding abutting surface.

2. A camera according to claim 1, comprising a shutter with an aperture function driven by a linear motor; said linear motor driving the shutter, wherein the linear motor has an integrated position sensing system.

3. A camera according to claim 2 comprising an integrated circuit controlling the linear motor driving the shutter and the at least one linear actuator moving the lens barrel; and said rolling elements bearings wherein rolling elements of each rolling element bearing are moving between the lens barrel and a fixed part of the camera.

4. A camera according to claim 1, wherein an offset is implemented between a longitudinal center line of magnets of an anchor of the at least one linear actuator and a longitudinal center line of a stator of the at least one linear actuator, wherein the offset generates permanent force in a tangential direction.

5. The camera according to claim 1, wherein said rolling element bearings are ball bearings.

6. The camera according to claim 1, wherein said rolling element bearings are roller bearings.

7. The camera according to claim 1, wherein protrusions of the lens barrel are used to apply a pre-load force on the rolling element bearings.

8. The camera according to claim 1, wherein at least one of said linear actuators has an integrated position sensing system.

\* \* \* \* \*

UNITED STATES PATENT AND TRADEMARK OFFICE
CERTIFICATE OF CORRECTION

| | | |
|---|---|---|
| PATENT NO. | : 8,594,494 B2 | Page 1 of 1 |
| APPLICATION NO. | : 13/684776 | |
| DATED | : November 26, 2013 | |
| INVENTOR(S) | : Jacobsen et al. | |

It is certified that error appears in the above-identified patent and that said Letters Patent is hereby corrected as shown below:

On the Title Page, item (72), under "Inventors", in Column 1, Line 1, delete "Dettingen unterTeck" and insert -- Dettingen unter Teck --, therefor.

In the Drawings:

In Sheet 2 of 4, FIG. 3b, delete " 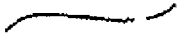 " and insert -- 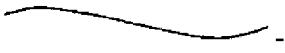 --, therefor.

In the Specification:

In Column 3, Line 33, delete "driven," and insert -- driven --, therefor.

In Column 4, Line 65, delete "anon" and insert -- a non --, therefor.

In the Claims:

In Column 6, Line 25, in Claim 2, delete "A" and insert -- The --, therefor.

In Column 6, Line 30, in Claim 3, delete "A" and insert -- The --, therefor.

In Column 6, Line 30, in Claim 3, delete "claim 2" and insert -- claim 2, --, therefor.

In Column 6, Line 35, in Claim 4, delete "A" and insert -- The --, therefor.

Signed and Sealed this
Thirtieth Day of September, 2014

Michelle K. Lee
*Deputy Director of the United States Patent and Trademark Office*